US007698207B2

(12) United States Patent
Lejdström et al.

(10) Patent No.: US 7,698,207 B2
(45) Date of Patent: Apr. 13, 2010

(54) AUTOMATED METHOD AND A SYSTEM FOR CLEARING AND SETTLING TRADES IN A CSD-SYSTEM

(75) Inventors: Bengt Lejdström, Sollentuna (SE); Fredrik Ohlsson, Solna (SE); Oskar Sander, Stockholm (SE); Michael Dimento, Sydney (AU)

(73) Assignee: OMX Technology, Stockholm (SE)

( * ) Notice: Subject to any disclaimer, the term of this patent is extended or adjusted under 35 U.S.C. 154(b) by 1308 days.

(21) Appl. No.: 10/784,892

(22) Filed: Feb. 24, 2004

(65) Prior Publication Data

US 2005/0010613 A1   Jan. 13, 2005

Related U.S. Application Data

(60) Provisional application No. 60/486,226, filed on Jul. 11, 2003.

(51) Int. Cl.
*G06Q 40/00* (2006.01)
(52) U.S. Cl. .......................................... 705/37; 705/35
(58) Field of Classification Search ................ 705/37, 705/35
See application file for complete search history.

(56) References Cited

U.S. PATENT DOCUMENTS

| 5,497,317 | A | * | 3/1996 | Hawkins et al. | 705/37 |
| 5,848,400 | A | * | 12/1998 | Chang | 705/35 |
| 5,918,218 | A | * | 6/1999 | Harris et al. | 705/37 |
| 6,029,146 | A | * | 2/2000 | Hawkins et al. | 705/35 |
| 6,247,000 | B1 | * | 6/2001 | Hawkins et al. | 705/37 |
| H2064 | H | * | 5/2003 | Buchalter | 705/37 |
| 6,754,640 | B2 | * | 6/2004 | Bozeman | 705/40 |

(Continued)

FOREIGN PATENT DOCUMENTS

| JP | 2001-283126 | 10/2001 |
| JP | 2002-318982 | 10/2002 |

OTHER PUBLICATIONS

Australian Patent Office Written Opinion and Search Report mailed Feb. 9, 2007; 7 pages Securities Registrars Association of Australia, Inc.; http://www.sraa.com.au/introduction_to_chess.htm; 4 pages.

(Continued)

*Primary Examiner*—Narayanswamy Subramanian
(74) *Attorney, Agent, or Firm*—Nixon & Vanderhye P.C.

(57) ABSTRACT

A method for financial transactions within a Central Securities Depository comprises a clearing process and a settlement process. The clearing process preparing the transactions for the settlement process selects a settlement rule to be followed in the clearing process. The rule defines how the transaction is to be settled and a settlement obligation group. The group includes a number of settlement instructions that must be settled at the same time. The clearing process also "locks in" the assets with which the transactions are concerned thereby reserving the assets for a specific settlement instruction. The settlement process includes selecting transfer instructions for all settlement obligations belonging to the settlement obligation group. The transfer instructions are irrevocable instructions to transfer the assets between participants in the CSD. The settlement process also checks that all transfer instructions are carried out successfully and reports the result of the settlement to the participants involved.

2 Claims, 3 Drawing Sheets

U.S. PATENT DOCUMENTS

| | | | |
|---|---|---|---|
| 6,876,982 B1* | 4/2005 | Lancaster | 705/37 |
| 7,318,049 B2* | 1/2008 | Iannacci | 705/39 |
| 7,376,614 B1* | 5/2008 | Scheinberg et al. | 705/37 |
| 2002/0128958 A1* | 9/2002 | Slone | 705/37 |
| 2002/0174066 A1* | 11/2002 | Kleckner et al. | 705/39 |
| 2003/0018554 A1* | 1/2003 | Lyftogt et al. | 705/35 |
| 2003/0163405 A1* | 8/2003 | Wiener et al. | 705/36 |
| 2003/0182219 A1* | 9/2003 | Bodurtha et al. | 705/36 |
| 2003/0200171 A1* | 10/2003 | Kochansky | 705/39 |
| 2004/0006529 A1* | 1/2004 | Fung | 705/37 |
| 2004/0039693 A1* | 2/2004 | Nauman et al. | 705/39 |
| 2004/0107156 A1* | 6/2004 | Levine | 705/37 |
| 2004/0138985 A1* | 7/2004 | Lundberg et al. | 705/37 |
| 2004/0236698 A1* | 11/2004 | Sweeney | 705/64 |
| 2007/0250437 A1* | 10/2007 | Lejdstrom et al. | 705/37 |
| 2007/0288347 A1* | 12/2007 | Lejdstrom et al. | 705/37 |
| 2009/0112775 A1* | 4/2009 | Chiulli et al. | 705/36 R |

OTHER PUBLICATIONS

Translation of Japanese Office Action, Oct. 27, 2009, in corresponding Japanese Application No. 2006-518213.

Masahi Nakajima, "*All about Securities Settlement System*", Toyo Keizai, Inc., Japan, 1$^{st}$ Edition, Feb. 21, 2002, pp. 1-19, 66-70 and 109-111.

* cited by examiner

AUTOMATED METHOD AND A SYSTEM FOR CLEARING AND SETTLING TRADES IN A CSD-SYSTEM

This application claims priority to U.S. Provisional Application No. 60/486,226, filed 11 Jul. 2003. The entire contents of this application are incorporated herein by reference.

TECHNICAL FIELD

The technology described below relates to a method and a system for use in a so called Central Securities Depository, commonly abbreviated as CSD. The technology facilitates the clearing and settlement of trades in such a system and standardizes settlement.

BACKGROUND

After World War II, many financial (and other) markets were forced to create so called Central Securities Depositories (CSD:s) in order to be able to handle soaring volumes of trade. A Central Securities Depository may be defined in the following manner: a facility (or an institution) for holding securities, which enables securities transactions to be processed by book entry. Physical securities may be immobilised by the depository, or securities may be dematerialised (i.e. they will exist only as electronic records). In addition to safekeeping, a central securities depository may incorporate comparison, clearing, and settlement functions.

Early examples of CSD:s are Frankfurter Kassenverein, DTC (New York), Sicovam (Paris) and Euroclear (Brussels).

Early CSD:s were based on the principle of joint centralised storage of certificates (immobilised securities). Holdings of securities were recorded in a book-entry system. Physical delivery of securities from seller to buyer was replaced by book entry transfer of the securities from seller's bank's account in the CSD to the account of buyer's bank. Participants in a CSD are market participants, e.g. brokers and banks, and in some cases also institutional investors.

Later CSD:s have in some cases handled dematerialised securities, i.e. issues that only exist in electronic form. The Nordic countries are examples of markets where securities—bonds and shares—in paper form no longer exist. The systems and procedures in a dematerialised CSD are similar to those of an immobilised CSD as outlined above.

Today more than 150 CSD:s exist around the world. Globalisation has led to an increase in cross-border trading, as well as consolidation of securities markets and the underlying infrastructure such as CSD:s. This means that more and more CSD:s serve the securities and the participants of more than a single particular market.

The main functions of a CSD are:
Registration of securities and ownership to securities
Clearing and settlement of trades in securities
Asset services (also sometimes referred to as corporate actions), e.g. payment of dividend or interest
Other services, e.g. collateral management for participants.

Clearing (or clearance) can be defined as the process of transmitting, reconciling, and, in some cases, confirming payment orders or security transfer instructions prior to settlement, possibly including the netting of instructions and the establishment of final positions for settlement.

Settlement can be defined as an act that discharges obligations in respect of funds or securities transfers between two or more parties.

CSD:s are based on automated Information Technology (IT) systems—most of which systems are tailored to the traditions and procedures of their home market. Globalization, consolidations among market participants and changes in investment patterns have resulted in a number of add-ons to these systems due to new requirements, for example new types of securities with special functions, or payments in foreign currency.

Clearing and settlement can take place in a number of different ways. Trades can be settled trade for trade (gross settlement), or in a batch where some sort of netting is described. An important principle that is often used is the principle of delivery versus payment (dvp). This means that if payment is made, the buyer can be absolutely certain that the securities are delivered.

The many changes and additions to settlement systems cause problems for CSD:s because it is difficult to change the IT systems to a structure that differs significantly from the original system requirements.

SUMMARY

There is thus a need for a method and a system by means of which trades can be settled within a CSD-system in an easier, more generalized, and more flexible manner. This need is addressed by the described method and system for carrying out clearing and settlement in a Central Securities Depository. The clearing process comprises:
selecting a settlement rule to be followed in the clearing process, the rule defining how the transaction is to be settled,
defining a settlement obligation group that comprises a number of settlement instructions that all have to be settled at the same time,
"locking in" of the assets which the transaction concern, the locking-in having the effect of reserving the assets for a specific settlement instruction.

By adding the automatic functions of selecting a "settlement rule", defining of "settlement obligation group", and "locking-in of assets" to the clearing process, it is possible to arrive at a simplified and generally applicable settlement process comprising:
automatically selecting transfer instructions for all settlement obligations belonging to said settlement obligation group, the transfer instructions being irrevocable instructions to transfer (the locked-in) assets between participants in the CSD,
automatically checking that all transfer instructions are carried out successfully,
automatically reporting the result of the settlement to the participants involved.

DETAILED DESCRIPTION

Below there is a description of a simplified automated clearing and settlement routine. The routine makes it easier for a CSD to adapt to changing market requirements and include new types of securities and new types of settlement. At the same time, the routine can be used for other CSD functions, such as collateral management and so called "corporate actions", e.g., payments of dividend or interest.

In order to simplify and generalise the settlement process, a number of concepts are introduced for use by automatic sub-processes or functions in the clearing of transactions to be settled:

Settlement rule: a settlement rule describes how a specific transaction or group of transactions is to be settled. For example, Swedish shares can be settled using the so called BIS model 2, i.e. gross settlements of securities followed by net settlement of funds transfers, also known as Delivery versus Payment in Securities Settlement Systems, and money market transactions are settled trade for trade using "RTGS"—Real Time Gross Settlement, i.e. gross, simultaneous settlement of securities and funds transfers Settlement obligation group: A group of settlement instructions that have to be settled together: either all instructions will settle or none of them will. For example, in a single dvp ("delivery versus payment", as explained above) transaction, the settlement obligation group consists of two instructions: The buyer's obligation to pay for a certain set of securities, and the seller's obligation to deliver those securities. In what is known as a batch settlement, a settlement obligation group can consist of thousands of instructions that have to be settled simultaneously.

Lock-in of assets before settlement. Assets can be money or securities. The assets are reserved for the purpose of a specific settlement instruction.

X versus Y: In the normal case, a settlement routine is required to settle securities trades: delivery of securities versus payment for the same securities. But there are other situations which are very similar, that could be handled by the same settlement routine:

Delivery of liquidity versus collateral (dvp) i.e. to provide funds against collateral Payment of Euros (€) versus payment of US Dollars ($), i.e. pvp, payment versus payment.

Exchange of one type of collateral versus another type of collateral, known as dvd. (Delivery versus delivery)

Delivery of a new issue of securities versus payment for those securities (also a dvp operation)

Delivery of securities free of payment

Payment of interest or dividend to all holders of a certain security.

In order to facilitate understanding, a brief description of some of the major functions in a CSD will now be given. This description is given with reference to FIG. 2, in which a brief outline of a CSD system is shown, comprising the following automated functions:

Gatekeeper
Issuer CSD
Investor CSD
Clearing
Settlement

Figure 1:
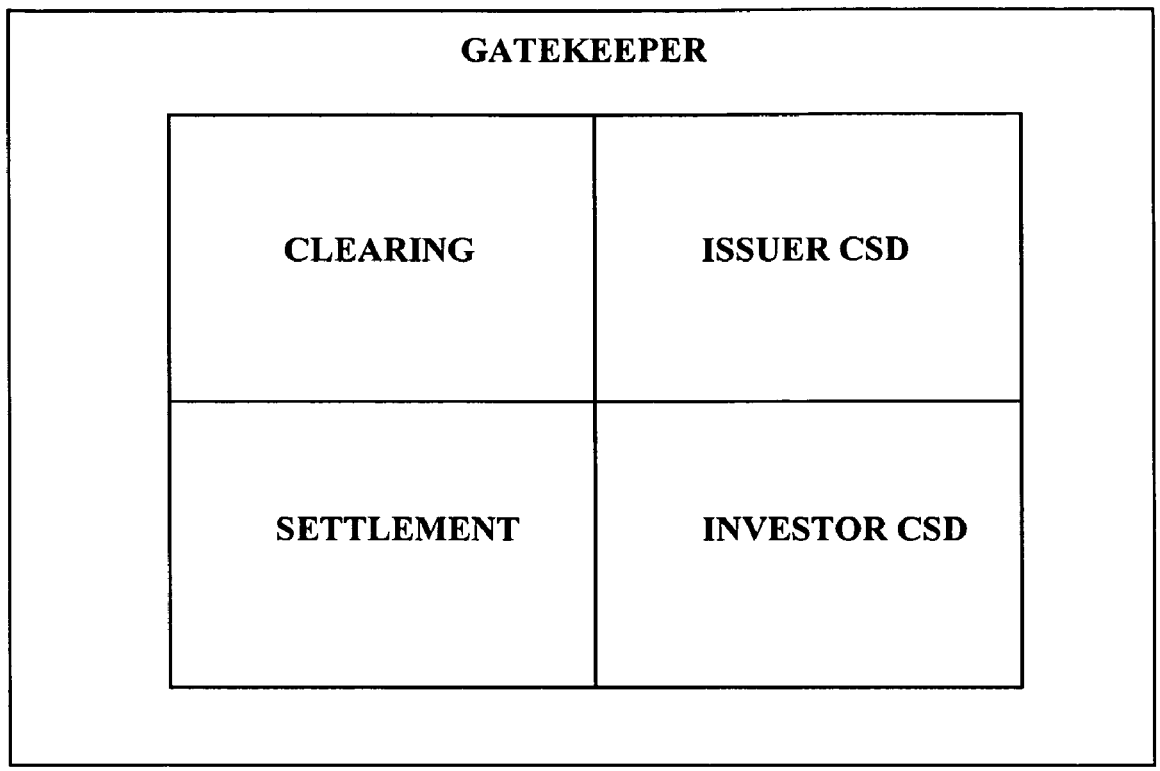
FIG. 1 shows some of the major functions in a CSD.

Briefly, the main purposes of each of the functions in a CSD, as shown in FIG. 1, are:

Gatekeeper: checks system security and authorisations, such as e.g. access and access rights for the participants of the CSD.

Issuer CSD: defines securities in the system, and checks on the total amount of instruments in the system and other associated CSD:s. Also defines corporate actions for individual instruments. The term "corporate action" will be defined below.

Investor CSD: registers ownership and other rights. Executes corporate actions.

Clearing: receives and registers trades in instruments, and makes the trades ready for settlement.

Settlement: executes deliveries and payments in connection with trading.

Figure 2:
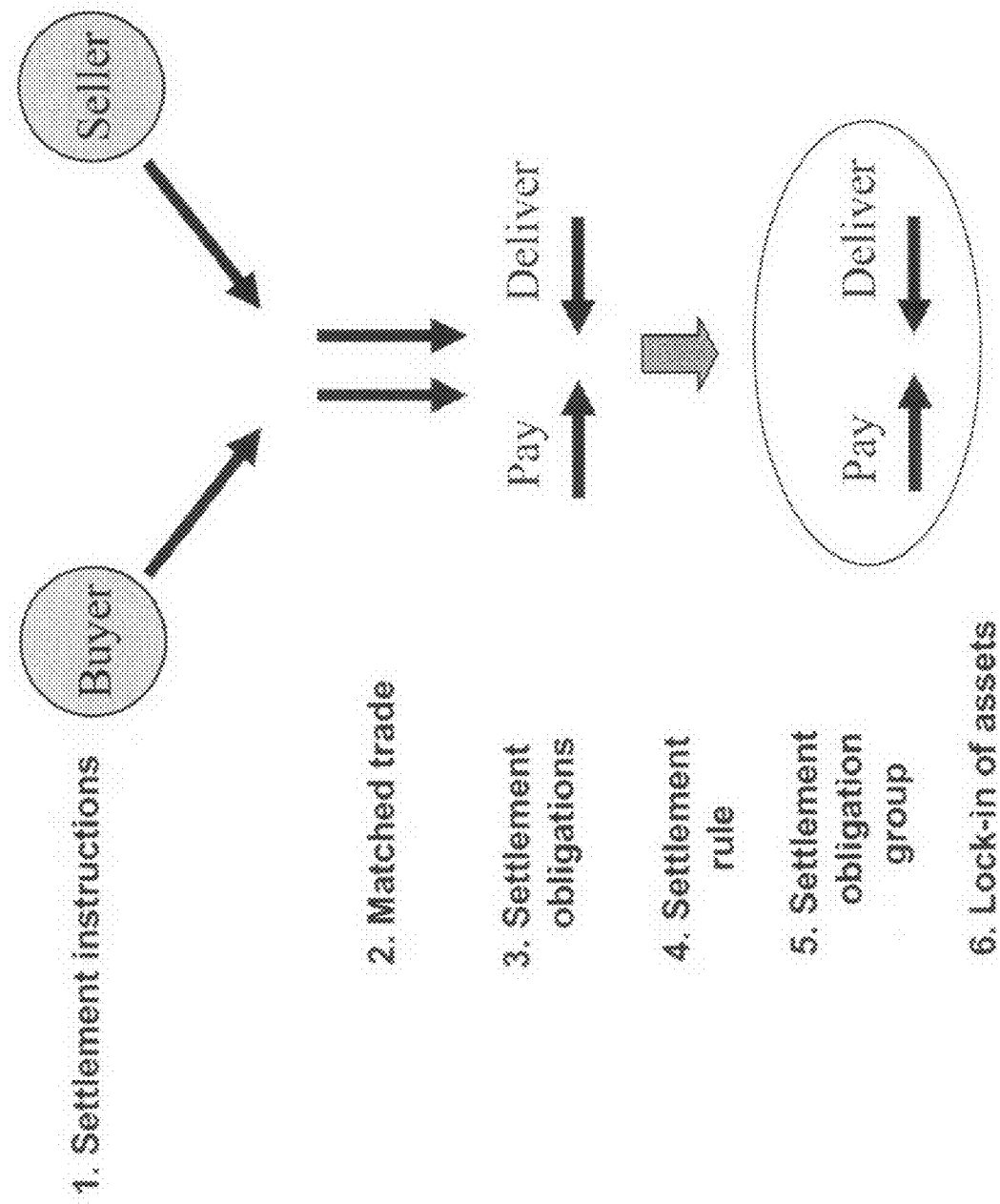
FIG. 2 shows some of the major steps in the clearing process—these steps lead up to the point where everything is confirmed and ready to settle. The settlement process is then reduced to the act of issuing irrevocable transfer instructions and to checking that they are successfully executed.
Figure 3:
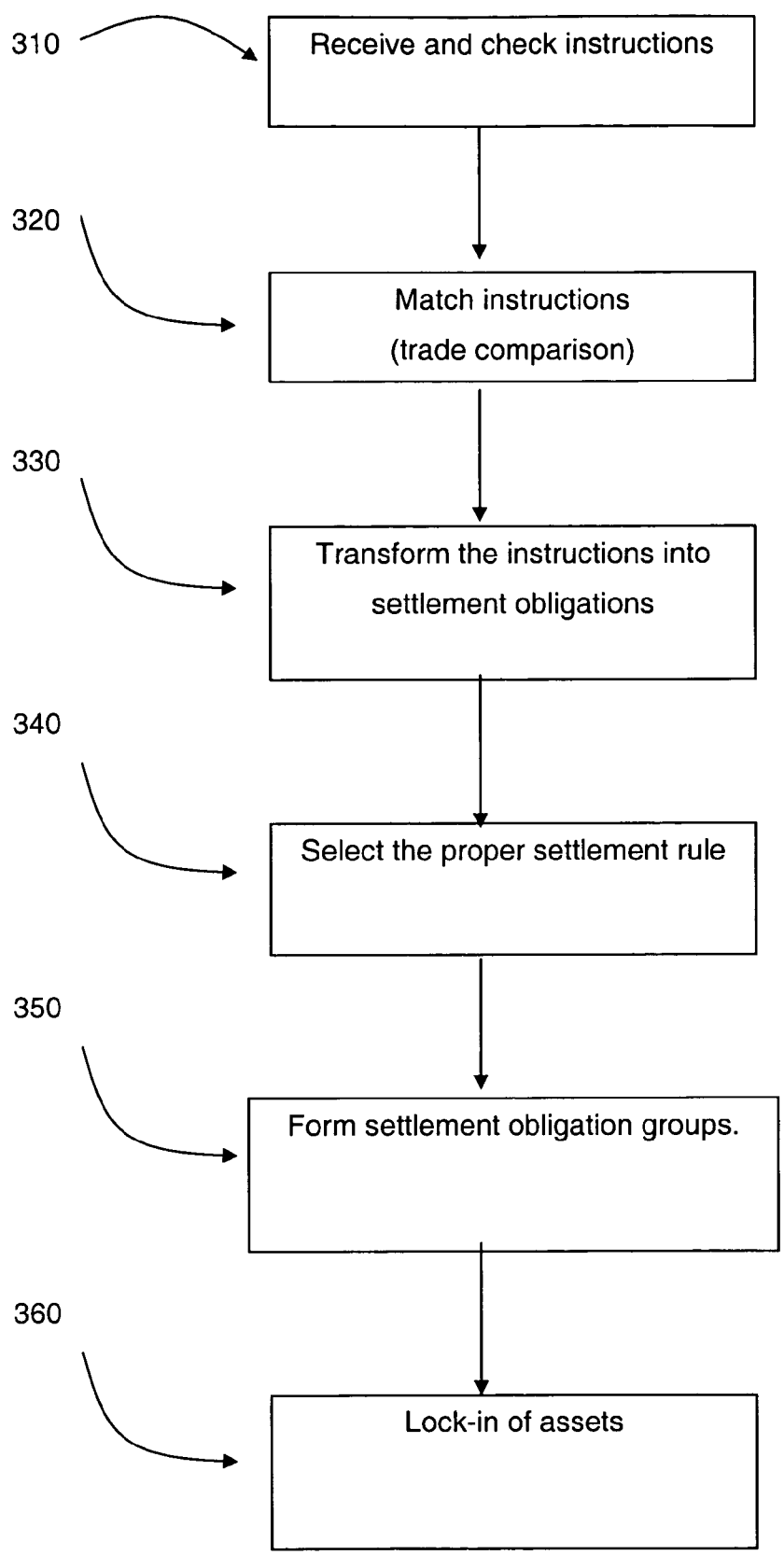
FIG. 3 shows a flowchart.

FIG. 2 is a simplified illustration of the clearing routine. Suitably, the steps are carried out in a computer or other such automated machine, with a minimum of intervention necessary by an operator of a CSD. However, a combination of automated and manual actions may be used. In addition, FIG. 3 shows a flow chart of the routine described below, the major steps of the routine being referenced with numbers in the flow chart, the numbers being shown below in parentheses for ease of reading.

The instructions of the participants are received and checked to ensure that all the necessary information is there. If necessary, additional information can be added for the participants' back-office functions. (310)

If the instructions are received from the participants (instead of direct trade capture from a stock exchange trading system) then the instructions are matched (trade comparison) to ensure that the participants agree on the basic conditions (e.g. the securities to be traded, volume, price, and settlement time). This step as well as the previous step is found in most clearing routines. (320)

The instructions are transformed into settlement obligations. (330)

The proper settlement rule is selected (340), and

Instructions that are ready for settlement are joined in one or more settlement obligation groups. (350)

The assets (securities to be delivered and/or money to be paid) are locked in, i.e. reserved for settlement. (360)

Following the steps outlined above, a generalized settlement routine is ready to take over.

Based on these concepts, the automated settlement routine or "engine" becomes very simple, flexible and applicable to the settlement of a very wide range of securities and market practices:

Select settlement obligation group
Issue irrevocable transfer instructions for the entire group
Check that all transfer instructions are carried out successfully
Report the successful settlement result.

Transfer instructions can be instructions to a connected payment system to transfer money from one participant in the system to another participant in the system. It can also be an instruction to the current CSD (or to another CSD connected to the current CSD) to transfer securities from one participant to another. Since all assets have been locked-in by the clearing function, one can be sure that the instructions will not be revoked.

Settlement of different types of securities, including settlement in foreign currency, so called cross systems settlement can be handled by such a generalised settlement engine without systems changes.

It is possible to structure so called corporate actions (e.g. dividend payments) so that the above settlement engine can be used. The same goes for a number of collateral management functions (e.g. change of collateral). This is important since systems maintenance becomes easier, and since all routines in a CSD that involve payments or transfer of ownership to securities have considerable audit and security requirements due to the large values handled by many CSDs.

The addition to the clearing process of settlement rule, settlement obligation group, and lock-in of assets makes it possible to build a simplified settlement process with very wide applications for CSD settlement and related functions:

Select settlement obligation group

Issue irrevocable transfer instructions for the entire group

Check that all transfer instructions are carried out successfully

Report the successful settlement result to the participants.

The invention claimed is:

1. An automated, computer-implemented method for carrying out financial transactions within a Central Securities Depository (CSD), comprising an automated, computer-implemented clearing process and an automated, computer-implemented settlement process, the clearing process preparing a financial transaction for the settlement process using the following automated, computer-implemented sub-process steps:

providing a set of settlement rules to be followed in the clearing process, selecting, by a first computer process, a settlement rule from the set of settlement rules to be followed in the clearing process, the settlement rule defining how the financial transaction is to be settled, defining, by a second computer process, a settlement instruction group including a number of settlement instructions to be settled at the same time, where the settlement instructions describe obligations of participants to the financial transaction, following the selecting and defining steps, locking-in, by a third computer process, the assets to which the financial transaction concerns, the locking-in having the effect of reserving said assets for a specific settlement, reserving by the third computer process said assets for the specific settlement based on the locking-in step, thereby clearing the financial transaction for settlement, and the settlement process includes the following automated, computer-implemented sub-process steps:

providing a set of transfer instructions, selecting, by a fourth computer process, transfer instructions from the set of transfer instructions for all settlement instructions belonging to said settlement instruction group, said transfer instructions being irrevocable instructions to transfer the locked-in assets between participants in the CSD, transferring by the fourth computer process the locked-in assets between the participants in the CSD, checking, by a fifth computer process, that said transfer instructions are carried out successfully to complete settlement of the financial transaction, and following the selecting and checking steps, reporting, by a sixth computer process, the result of the settlement to participants involved in the financial transaction.

2. An automated system for carrying out financial transactions within a Central Securities Depository (CSD), said system comprising:

a computer having an input for receiving financial transaction information and a output, wherein the computer is configured to perform an automated function for a clearing process and an automated function for a settlement process, the computer being configured to implement the clearing process function for a financial transaction using the following computer implemented sub-functions:

a first automated sub-function for the selection from a set of provided settlement rules of a settlement rule to be used in the clearing process, the settlement rule defining how the financial transaction is to be settled, a second automated sub-function for the definition of a settlement instruction group including a number of settlement instructions to be settled at the same time, where the settlement instructions describe obligations of participants involved in the financial transaction, a third automated sub-function for locking-in the assets to which the financial transaction concern, the locking-in having the effect of the system reserving said assets for a specific settlement, for reserving said assets for the specific settlement based on the locking-in step, thereby clearing the financial transaction for settlement and wherein the computer is configured to perform the settlement process function using the following computer-implemented sub-functions:

a fourth automated sub-function for selecting transfer instructions from a set of provided transfer instructions for all settlement instructions belonging to said settlement instruction group, said transfer instructions being irrevocable instructions to transfer the locked-in assets between participants in the CSD, and for transferring the locked-in assets between participants in the CSD, a fifth automated sub-function for checking that said transfer instructions are carried out successfully to complete the settlement of the financial transaction, and a sixth automated sub-function for reporting via the output the result of the settlement to participants involved in the financial transaction.

\* \* \* \* \*